United States Patent [19]
Friend

[11] Patent Number: 5,091,122
[45] Date of Patent: Feb. 25, 1992

[54] METHOD FOR MICROENCAPSULATION OF BASIC SOLUTIONS

[75] Inventor: David R. Friend, Menlo Park, Calif.

[73] Assignee: Idemitsu Kosan Company, Ltd., Tokyo, Japan

[21] Appl. No.: 173,071

[22] Filed: Mar. 24, 1988

[51] Int. Cl.$^5$ .............................................. B01J 13/04
[52] U.S. Cl. .................................. 264/4.33; 264/4.6; 428/402.22
[58] Field of Search ............... 424/462, 497; 264/4.33, 264/4.6, 4.3; 428/402.22

[56] References Cited

U.S. PATENT DOCUMENTS

| | | | |
|---|---|---|---|
| 3,427,250 | 2/1969 | Haas et al. | 264/4.7 X |
| 3,523,907 | 8/1970 | Vranken et al. | 264/4.6 |
| 3,645,911 | 2/1972 | van Besauw et al. | 264/4.6 |
| 3,790,497 | 2/1974 | Sato et al. | 264/4.3 |
| 4,049,604 | 9/1977 | Morehouse, Jr. et al. | 264/4.7 X |
| 4,353,962 | 10/1982 | Himel et al. | 264/4.6 X |
| 4,479,911 | 10/1984 | Fong | 264/4.60 |
| 4,520,091 | 5/1985 | Kakimi et al. | 428/402.2 X |
| 4,565,764 | 1/1986 | Nakahara et al. | 428/402.2 X |
| 4,675,140 | 6/1987 | Sparks et al. | 264/4.3 |
| 4,690,786 | 9/1987 | Ninomiya et al. | 264/4.6 |

OTHER PUBLICATIONS

McCutcheon's Detergents and Emulsifiers, 1973, N. Amer. Edition, (Allured Publishing Co., Ridgewood, N.J.).

Alcolac Technical Data Sheet, ABEX® JKB (Alcolac, Inc.) 1976.

Kendo, Asaji, *Microcapsule Processing and Technology*, (Marcel Dekker, New York) 1979, chap. 15, pp. 154-165.

Primary Examiner—Richard D. Lovering
Assistant Examiner—John M. Covert
Attorney, Agent, or Firm—Koda and Androlia

[57] ABSTRACT

A method of preparing microencapsulated basic solutions including the steps of preparing a polymer which is hydrophobic at high pH values, preparing a basic solution, dissolving the polymer in an organic solvent, adding a surfactant to the polymer solution, adding the basic solution to the dissolved polymer, emulsifying the basic solution and dissolved polymer and spray drying the emulsion while stirring the emulsion.

10 Claims, 2 Drawing Sheets

METHOD FOR MICROENCAPSULATION OF BASIC SOLUTIONS

BACKGROUND OF THE INVENTION

1. Field of the Invention

This invention relates to a method of microencapsulation and particularly to a method for microencapsulating basic solutions and particularly, sodium hydroxide.

2. Prior Art

In the prior art there exists methods for microencapsulation. Such methods are utilized to microencapsulate several different types of liquids. However, the prior art methods of microencapsulation have certain difficulties in that the microencapsulation produces microcapsules of irregular shape, of inconsistent wall thickness, clumping of the microcapsules which are too large, do not provide controlled release of the microencapsulated fluid and low yields of microcapsules.

Examples of methods for microencapsulation of various products are shown in U.S. Pat. No. 3,886,084; U.S. Pat. No. 4,273,672; U.S. Pat. No. 4,495,509; U.S. Pat. No. 4,525,520 and U.S. Pat. No. 4,599,271.

SUMMARY OF INVENTION

Accordingly, it is a general object of the present invention to produce microcapsules of basic solutions which are regular in shape, have a consistent and desirable wall thickness, are small in size, provide controlled release of the basic solution, have a high yield and do not clump together.

It is another object of the present invention to produce microencapsulated basic solutions by a method which is reliable, repeatable and not complex or high in cost.

In keeping with the principles of the present invention, the objects are accomplished by a unique method of preparing microencapsulated basic solutions including the steps of preparing a polymer which is hydrophobic at high pH values and comprises a copolymer of styrene and amino styrene, preparing a basic solution, dissolving the polymer in a solvent, adding the basic solution to the dissolved polymer, emulsifying the basic solution and the dissolved polymer and spray drying the emulsion while stirring.

BRIEF DESCRIPTION OF THE DRAWINGS

The above mentioned features and objects of the present invention will become more apparent with reference to the following description taken in a conjunction with the accompanying drawings, wherein like reference numerals denote like elements and in which.

DETAILED DESCRIPTION OF THE INVENTION

Figure 1:
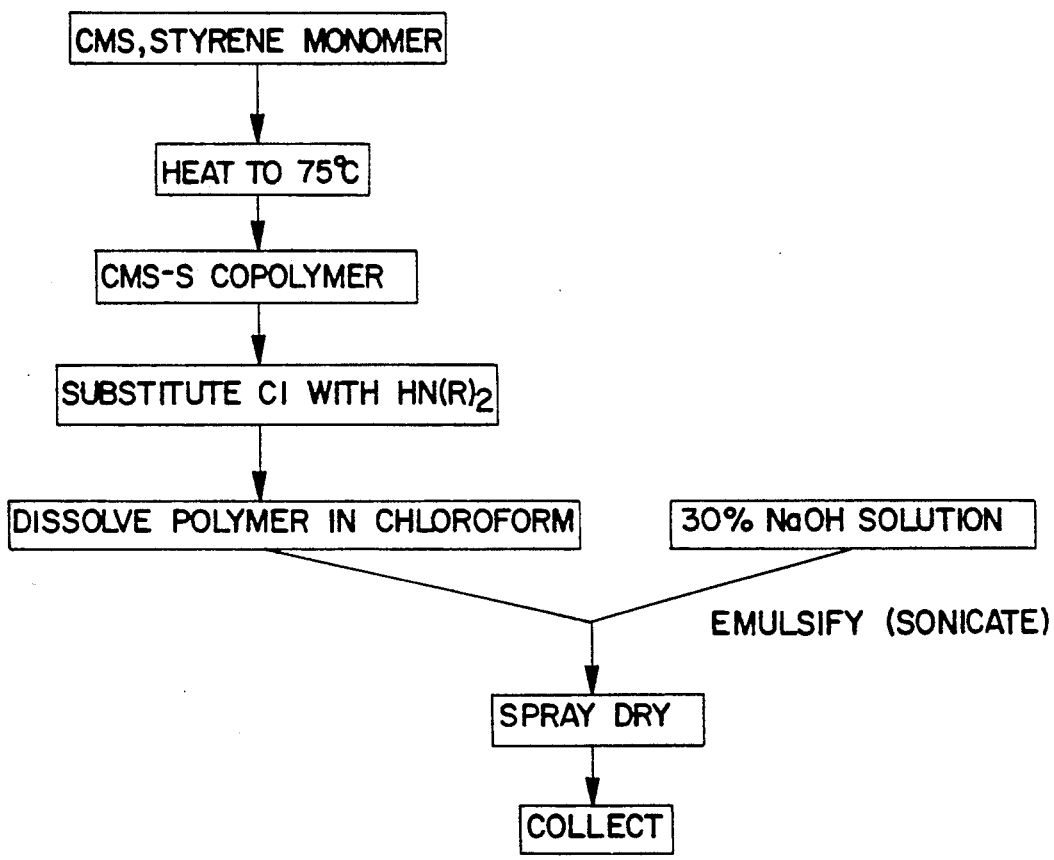
FIG. 1 is a flow diagram of the microencapsulation method of the present invention.

As shown in the flow diagram of FIG. 1 the present invention's method of microencapsulating basic solutions starts by preparing a suitable polymer or copolymer. The polymer or copolymer is hydrophobic at high pH values and comprises a polymer or copolymer of styrene, ethylene, propylene, butene, and butadiene and a side chain of one or a combination selected from the group consisting of compounds containing hetero atoms (P, N) such as those represented by the chemical structures for example:

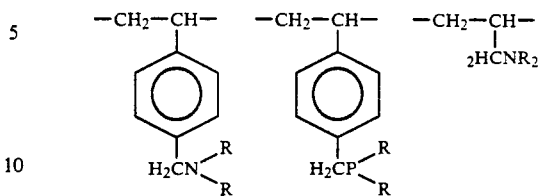

one such suitable copolymer is a copolymer of styrene and amino styrene. Also, it was found that by using an amine, the amine group polymer would protonate as the external pH dropped causing the polymer to swell with water and making the polymer permeable to basic solution. Conversely, as the basic solution was released, the external pH would rise causing deprotonation of the amine groups and stopping the release of the basic solution. As a result, controlled release of the basic solution can be achieved. One such copolymer is described below.

Figure 2:
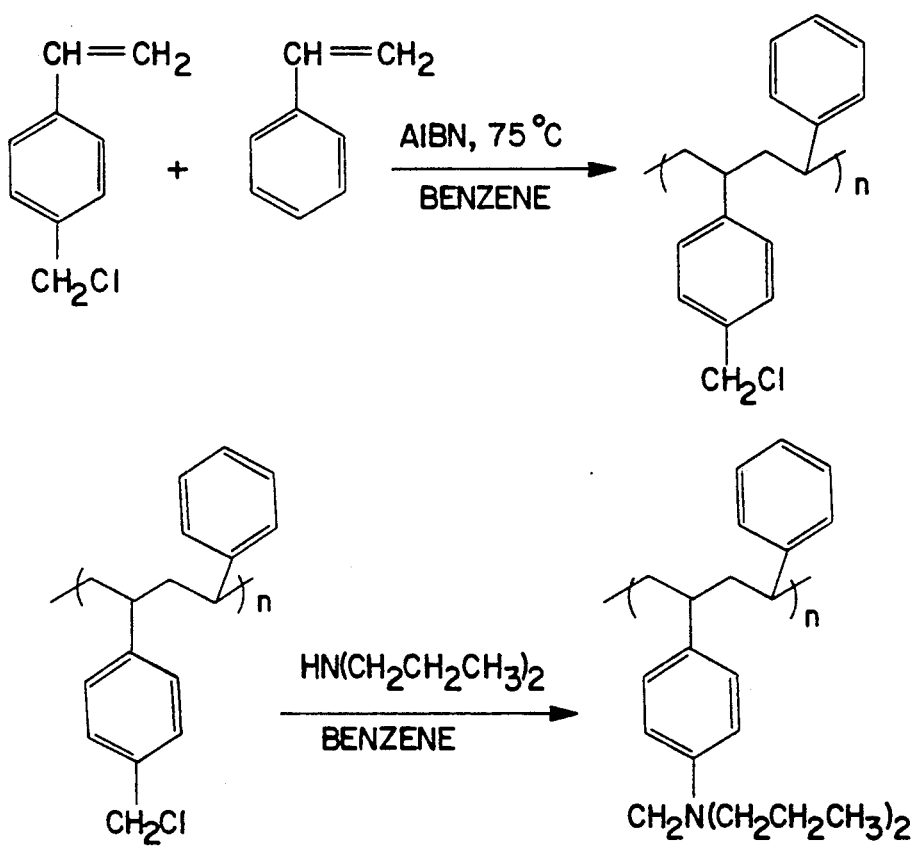
FIG. 2 illustrates the reaction to create the copolymer of styrene and amino styrene utilized in the present invention.

Referring to FIG. 2, shown therein is the technique for preparing an amine-containing styrene copolymer which in this case is dipropylaminomethylstyrene-styrene (DPAS-S) and this copolymer is generally made by forming a copolymer of styrene and chloromethylstyrene and then displacing the chloro group in the copolymer with a secondary amine to produce a tertiary alkyl amine (DPAS-S). While the secondary amine utilized in the method to be described in detail below is dipropylamine other diamines could be used such as dibutylamine or dipentylamine.

A detailed example of the preparation of a suitable copolymer of styrene and amino styrene will now be given. First polystyrene is prepared by dissolving 5 gr of styrene in 45 ml of toluene. The solution is purged of oxygen with argon for 30 minutes. Next several crystals of 2, 2' azobis (2-methylpropionitrile) (AIBN) are added to the solution and the solution heated to 100° C. for 12 hours. The polymer is precipitated by dropping the solution into an excess of methanol. A polymer of chloromethylstyrene (CMS) is prepared by dissolving 0.96 gr of CMS in 12 ml of benzene. The solution is purged of oxygen and 9.6 mg of AIBN are added thereto. The solution is next heated at 75° C. for 24 hours and the resulting polymer is precipitated by dropping the solution in an excess of methanol.

The copolymer of CMS and styrene is prepared by adding styrene and CMS to benzene. The solution is then purged of oxygen and a few crystals of AIBN are added thereto. The solution is then heated at 75° C. for 24 hours and the polymer is precipitated by dropping the solution into an excess of methanol.

Suitable ranges for the amounts of styrene and CMS are respectively 8.55 to 10.92 g and 1.53 to 6.45 g. Also, while the solvent utilized is described as benzene above, other organic solvents may be utilized such as toluene and when a solvent such as toluene is utilized, the heating temperature may be raised to 90° C.

The resulting copolymer is chloromethylstyrene-styrene (CMS-S) and the DPAS-S copolymer is prepared from this CMS-S copolymer by dissolving the CMS-S copolymer is 25 ml of benzene. Next the secondary amine which is dipropylamine is added to the solution and the solution heated at reflux for 20 hours. The ratio by weight of dipropylamine to CMS-S polymer depends on the number chloro groups present on the CMS-S polymer and may vary from 0.36 to 1.71. Next, the DPAS-S is precipitated by dropping the solution into an excess of methanol.

With the preparation of the desired copolymer completed, the microencapsulation process of the basic solution, in this case sodium hydroxide, can now proceed.

As shown in FIG. 1, a 10 to 30% concentration solution of sodium hydroxide is prepared by dissolving sodium hydroxide in water. The polymer solution is then prepared by dissolving the DPAS-S polymer is chloroform.

Next a surfactant such as sorbitan trioleate (SPAN-85) or a pluronic (PLURONIC F68 or L31) or ABEX JKB (an anionic sufactant made by Alcolac) is added in amount of 1 to 2% to the polymer solution.

The sodium hydroxide solution is then added to the polymer solution and the suspension emulsified by sonification. The emulsion is next spray dried while being stirred with a magnetic stir bar utilizing a spray dryer such as the Yamato Pulvis Basic Unit, Model GB-21. The conditions for spray drying are as follows.

Air Pressure—2.0 kg/cm$^2$
Inlet Temperature—80° C.
Outlet Temperature—45° C.
Aspirator Setting—4
Liquid Flow Rate—7.5 l/min.

The size of the microcapsules is determined by the nozzle size and air pressure and can be suitably adjusted by varying the nozzle size and air pressure. The dried microcapsules are then collected.

While the above method of microencapsulation is described in terms of utilizing DPAS-S, other copolymers of styrene and amino styrene may be utilized which are dissolvable in suitable solvents such as N-acetylaminostyrene-styrene and such a copolymer can be prepared by suitable chemical processing known in the art. Furthermore, while the above description has been given in terms of using a secondary amine to displace the chloro-group in CMS, other polymers or copolymers having a chloro-group such as chlorostyrene, chloroethylene, chloropropylene, chlorobutene and chlorobutadiene could be used and instead of a secondary amine other chemicals such as phosphine could be used to displace the chloro-group.

Utilizing the method described above, basic solutions can be repeatedly microencapsulated and microcapsules can be created which are regular in shape, have consistent wall thickness, do not clump together and have a high yield. In addition, microcapsules with a size from less than 1 μm to less than 50 μm, preferably 1 to 2 μm, and which provide controlled release of the NaOH can be made.

It should be apparent to those skilled in the art that the above described embodiments are merely illustrative of but a few of the many specific embodiments which employ the principles and objects of the present invention. Numerous and various other arrangements could be readily devised by those skilled in the art without departing from the spirit and scope of the invention.

I claim:

1. A method of microencapsulation of basic solutions comprising the steps of:
   preparing a polymer which is hydrophobic at high pH levels, said polymer comprising a di-alkylaminomethyl or di-alkylphosphinomethyl substituted polymer or copolymer selected from the group consisting of styrene, ethylene, propylene, butene and butadiene;
   preparing a basic solution;
   dissolving the polymer in a solvent;
   adding a surfactant to the polymer solution;
   adding the basic solution to the dissolved polymer solution to form a mixture;
   emulsifying the mixture of basic solution and dissolved polymer solution by sonification;
   maintaining the emulsion by mixing; and
   spray drying the emulsion.

2. A method of microencapsulation of basic solutions according to claim 1, wherein the polymer is a polymer or copolymer selected from the group consisting of chlorostyrene, chloroethylene, chloropropylene, chlorobutene and chlorobutadine or a copolymer consisting of those chlorocompounds and other compounds selected from the group consisting of styrene, ethylene, propylene, butene and butadiene and a chloro-group of the copolymers is displaced by one selected from the group consisting of amine and phosphine.

3. A method for microencapsulation of basic solutions according to claim 2, wherein said polymer is chloromethyl-styrene-styrene copolymer which is obtained by a reaction of chloromethylstyrene and styrene and the chloro-group of said copolymer is displaced with a secondary amine to produce tertiary amine.

4. A method according to claim 3, wherein said secondary amine is one selected from the group consisting of dipropylamine, dibutylamine and dipentylamine.

5. A method for microencapsulation of basic solutions according to claim 3, wherein said tertiary amine is dipropylaminomethylstyrene.

6. The method for microencapsulation of basic solutions according to claim 1, wherein the polymer is prepared by reacting chloromethylstyrene with styrene to produce chloromethylstyrene-styrene, displacing the chloro group in the chloromethylstyrene-styrene, copolymer with a secondary amine to form a tertiary alkyl amine.

7. The method for microencapsulation of basic solutions according to claim 6, wherein the secondary amine is selected from the group consisting of dipropylamine, dibutylamine, or dipentylamine.

8. The method for microencapsulation of basic solutions according to claim 7, wherein the tertiary alkyl amine is dipropylaminomethylstyrene-styrene.

9. The method of microencapsulation of basic solutions according to claim 8, wherein the basic solution is sodium hydroxide.

10. The method for microencapsulation of basic solutions according to claim 11, wherein the size of the microcapsules is varied by varying the air pressure and nozzle size during spray drying.

* * * * *